(12) United States Patent
Stryker et al.

(10) Patent No.: US 6,472,848 B2
(45) Date of Patent: Oct. 29, 2002

(54) REDUCING BATTERY DISCHARGE CURRENT BY THROTTLING CPU POWER

(75) Inventors: Chadwick W Stryker, Albany; Andrew L Van Brocklin, Corvallis, both of OR (US)

(73) Assignee: Hewlett-Packard Company, Palo Alto, CA (US)

( * ) Notice: Subject to any disclaimer, the term of this patent is extended or adjusted under 35 U.S.C. 154(b) by 31 days.

(21) Appl. No.: 09/765,842

(22) Filed: Jan. 18, 2001

(65) Prior Publication Data

US 2002/0093311 A1 Jul. 18, 2002

(51) Int. Cl.[7] .............................. H02J 7/00; G06F 19/00
(52) U.S. Cl. .......................................... 320/135; 702/63
(58) Field of Search ................................. 320/135, 136, 320/137; 702/63, 64; 307/10.7; 323/269, 297; 700/297, 286

(56) References Cited

U.S. PATENT DOCUMENTS

| 4,203,153 A | | 5/1980 | Boyd ........................... 364/200 |
| 5,164,653 A | * | 11/1992 | Reem .......................... 320/135 |
| 5,343,137 A | * | 8/1994 | Kitaoka et al. ............. 307/10.7 |
| 5,754,436 A | * | 5/1998 | Walsh et al. ................. 700/286 |
| 5,848,380 A | * | 12/1998 | Arai ............................. 702/63 |
| 6,014,611 A | | 1/2000 | Arai et al. ................... 702/132 |
| 6,029,251 A | | 2/2000 | Williams et al. ............ 713/501 |
| 6,324,339 B1 | * | 11/2001 | Hudson et al. ............. 320/135 |

FOREIGN PATENT DOCUMENTS

WO    WO 00/39661    7/2000

* cited by examiner

Primary Examiner—Gregory Toatley
Assistant Examiner—Pia Tibbits

(57) ABSTRACT

CPU power consumption is throttled in relation to the discharge current of a battery pack to prevent battery cells of the battery pack from reaching a critical temperature. When a discharge current measuring circuit detects that discharge current exceeds a threshold level, a throttle signal is activated. In response, a CPU stop control line is modulated to reduce CPU power consumption. When the discharge current falls below another threshold and/or after a prescribed time delay, the throttle signal is withdrawn. The duty cycle of the CPU stop control line is determined as a function of the excess discharge current (i.e., actual discharge current level less safety threshold current level). The more excessive the actual discharge current, the larger the duty cycle on the CPU stop modulation line, and the greater the degree that CPU power consumption is reduced.

20 Claims, 4 Drawing Sheets

REDUCING BATTERY DISCHARGE CURRENT BY THROTTLING CPU POWER

BACKGROUND OF THE INVENTION

This invention relates to methods and apparatus for regulating battery discharge, and more particularly, to a method and apparatus for controlling power drawn from a battery in a battery powered computing system.

Conventional batteries for portable computers include lithium ion (Li-(Li-ion) battery packs, nickel metal hydride (NiMH) and nickel cadmium ('NiCad') battery packs. The power sourcing capability of a battery pack is typically the product of the number of battery cells in the pack and the maximum power that can be produced by a single cell. The discharge current drawn from a battery pack is based upon the load requirements. For portable computers the load requirement is continually increasing as more powerful, and feature-rich systems are desired. Thus, advances in processor technology, for example, result in processors with correspondingly increasing power needs.

Problems arise, however, in sourcing increased discharge current to meet the increased power needs of advancing technology. As the discharge current rises, the temperature of the battery source increases. When the discharge current becomes excessive, the temperature of the cells may increase toward a critically high level, beyond which the battery cells become irreparably damaged. To prevent such excessive temperature condition, the battery halts its discharge when the discharge current exceeds a safety limit. As a result, the load loses power. For a computer, such loss of power can result, undesirably, in a loss of data. Accordingly, there is a need to avoid loss of power and corresponding loss of data in a computer system when the load begins to demand power from the battery system which is beyond acceptable limits.

SUMMARY OF THE INVENTION

According to the invention, a processor's power requirement is reduced when the battery pack approaches its critical temperature. This reduces the battery discharge current, in turn causing the battery pack to generate less heat. The battery pack temperature thus remains safely below the critical temperature.

Battery discharge current is measured. According to one aspect of the invention, when a discharge current measuring circuit detects that the discharge current exceeds a first threshold current level, a throttle signal is sent to the system's CPU chip set. In response, the chip set modulates a CPU stop control line to reduce power consumption. In brief, the CPU halts while the stop control line is active. As the stop control line modulates, the CPU is slowed according to the duty cycle of the stop modulation.

A delay occurs between assertion of the throttle signal and the commencement of the CPU stop modulation operations. When the discharge current falls below the threshold current value (or a second threshold current value), the throttle signal is withdrawn. In various embodiments the second threshold is less than the first threshold to provide a hysteresis effect. In addition or alternatively, a time delay is imposed before the throttle signal is withdrawn.

While the throttle signal is active, the CPU stop control line is modulated at a specific duty cycle. During the active part of the duty cycle, the CPU is stopped. During the inactive portion, the CPU operates normally. Accordingly, the CPU is stopped periodically to reduce the power consumption of the CPU, and correspondingly, to reduce the discharge current being drawn from the battery pack.

According to another aspect of the invention, in some embodiments the duty cycle for the CPU stop control line is controlled as a function of the excess discharge current (i.e., actual discharge current level less threshold current level). The more excessive the actual discharge current, the larger the duty cycle on the CPU stop modulation line. Thus, the more excessive the discharge current, the more time, proportionately, that the CPU is stopped and the greater the degree that CPU power consumption is reduced.

An advantage of the invention is that a smaller battery pack can be used safely with an increasingly powerful CPU. In particular, when the computing system is operating on line current in AC mode without the battery, the CPU can operate at full speed drawing the power as needed to maximize system performance. When the system is operating off the battery pack, performance will not be affected for many applications where excessive power is not drawn. Performance is traded off under high power draining conditions in exchange for the reduced cost and lighter weight of a smaller battery pack. As a result, a smaller battery pack is used safely to meet the needs of many computing applications. This may be particularly beneficial for the value segment of the portable computing market where cost is a significant factor. These and other aspects and advantages of the invention will be better understood by reference to the following detailed description taken in conjunction with the accompanying drawings.

DESCRIPTION OF SPECIFIC EMBODIMENTS

Figure 1:
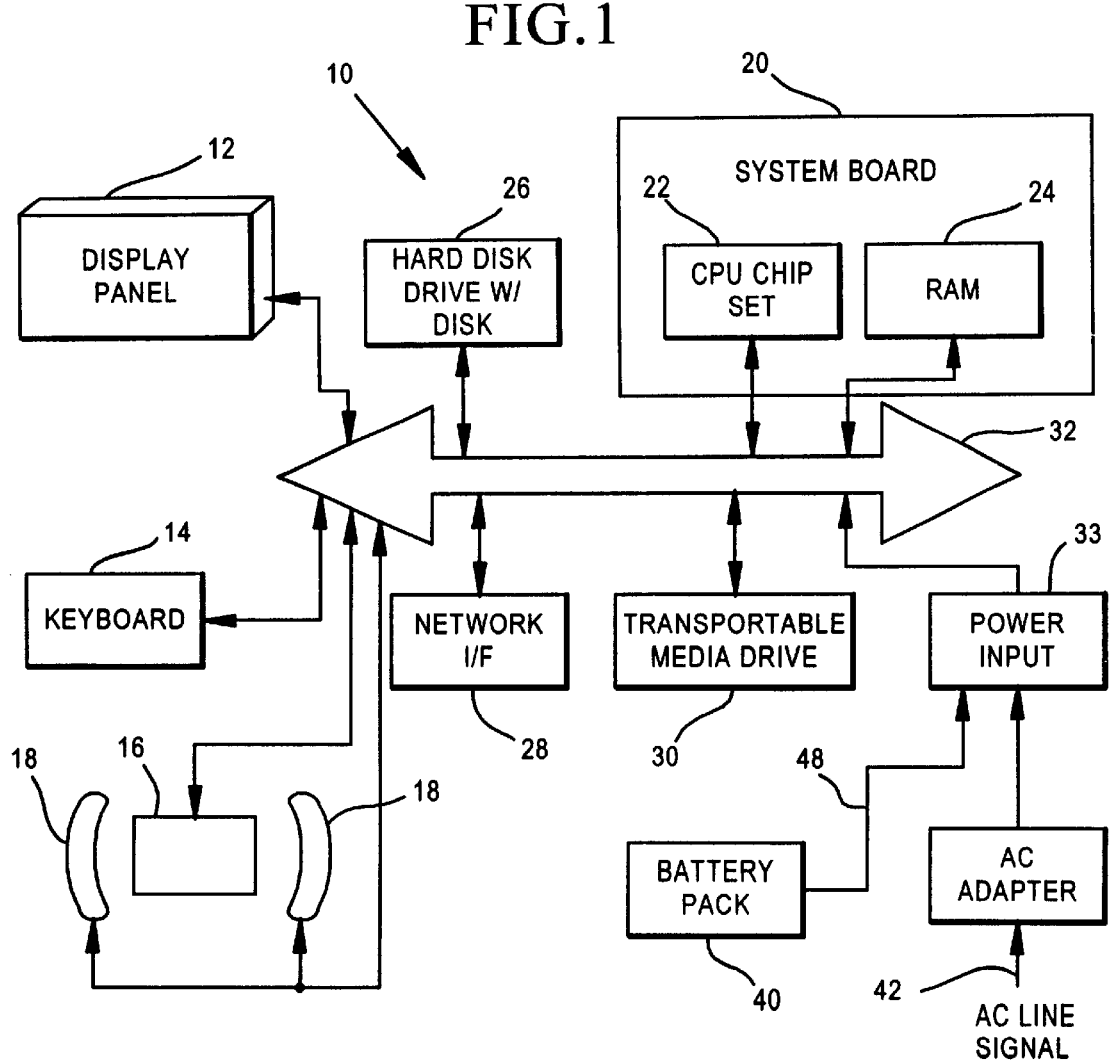
FIG. 1 is a block diagram of a portable computing system.

Referring to FIG. 1, the CPU throttling embodiment is hosted on a general purpose, programmed portable computing system 10 of the type which is well known in the art. The portable computer system 10 has a display panel 12, a keyboard 14, a pointing device 16 with buttons 18, a system board 20 with a central processing unit (CPU) chip set 22 and random access memory (RAM) 24, a hard disk drive 26 with hard disk, and optionally—one or more network interfaces 28 (e.g., modem, Ethernet adapter, infrared adapter), and one or more transportable storage media drives 30 and media (e.g., CD-ROM drive, DVD-ROM drive, floppy disk drive, zip drive, Bernoulli drive). The various components interface and exchange data and commands through one or more busses 32. The computer system 10 receives information by entry through the keyboard 14, pointing/clicking devices 16/18, the network interface 28 or another input device or input port. The computing system 10 is powered by direct current from a battery pack 40 or as converted from an AC line signal 42.

Figure 2:
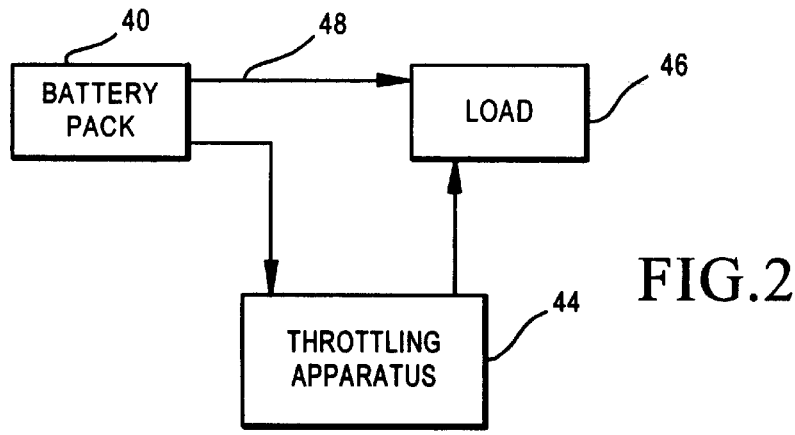
FIG. 2 is a block diagram of a system for throttling power usage from a battery pack.

Referring to FIG. 2 a throttling apparatus 44 is coupled to the battery pack 40 and a load 46 powered by the battery pack 40. The throttling apparatus 44 throttles the power consumption of the load 46. In preferred embodiments, the load 46 is the CPU, CPU chip set 22 or the system board 20. In alternative embodiments, the load 46 is another system component of the computing system 10. Accordingly, system power consumption is throttled in various embodiments by throttling the power consumption of the CPU, the system board components, or another component or peripheral device of the system 10. In particular, note that it is the power demand by the load 46 which is being throttled, as distinct from a limitation on the ability of the battery pack 40 to deliver a discharge current 48.

The battery pack 40 is a conventional battery pack of the type used for portable computing systems, such as a Li-ion battery pack or a NiMH battery pack. The battery pack 40 includes a plurality of battery cells. Conventionally, the battery packs also include internal circuitry for monitoring the time averaged discharge current of the battery pack. Too high a discharge current causes the temperature of the battery pack to approach a critical level at which irreparable damage can occur to the battery cells. When such time average exceeds a prescribed safety limit, the battery pack turns itself off. This is a safety feature of the battery pack which prevents irreparable damage to the battery pack. However, by turning itself off there no longer is a power supplied to the computing system 10. As a result, the computing system 10 may suffer a loss of data.

Some conventional CPU chip sets include a CPU stop line which allows the CPU to be halted periodically at some fixed duty cycle. The CPU stop line also is referred to as a thermal over-temperature signal. As CPU speeds have increased, the power requirements of the CPU also have increased. As the CPU consumes more power, it generates more heat. The advances in CPU technology often outpace other technologies in the computer. As a result, there has been a need to control the amount of heat generated by the CPU so as not to damage other components. In particular, when the CPU operates at high power consumption, the CPU generates a lot of heat which raises the temperature of the surrounding area. Adjacent chips may become exposed to temperatures outside the desired temperature operating range. To avoid damage, designers have included the CPU stop line as a way of controlling CPU power consumption to limit CPU heat generation and surrounding temperature. For Intel processors, the signal is known as the "STPCLK#" signal.

Figure 3:
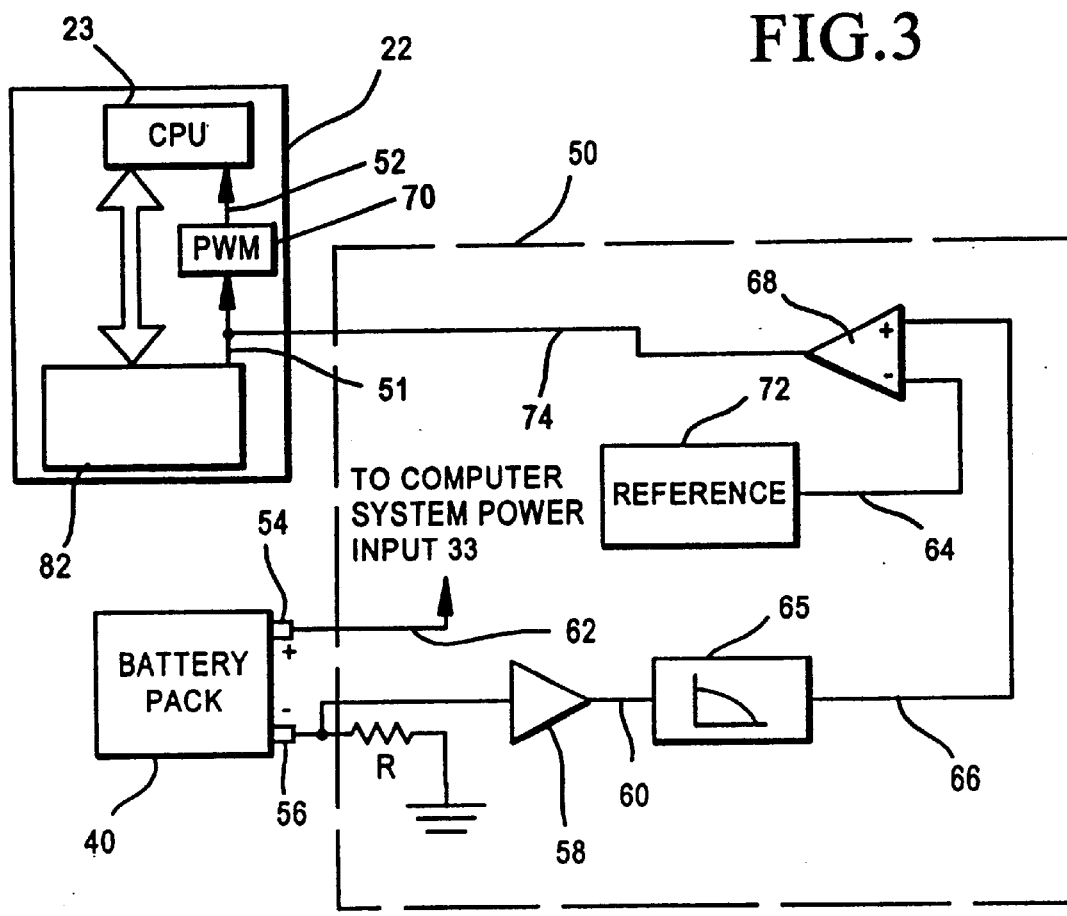
FIG. 3 is a schematic diagram of the system of FIG. 2 according to a specific embodiment of the invention.

Referring to FIG. 3, in one embodiment, a portion 50 of the throttling apparatus 44 connects to the CPU stop line 52 via a resident pulse width modulator (PWM) 70. The PWM 70 receives a thermal overtemp signal 51 from the temperature monitor 82 or a CPU throttling control signal 74 from the throttling apparatus portion 50. The thermal overtemp signal 51 is based on the conventional technique for controlling CPU temperature. The CPU throttling control signal 74 is based on the comparison of the battery discharge current level to a threshold level.

Figure 4:
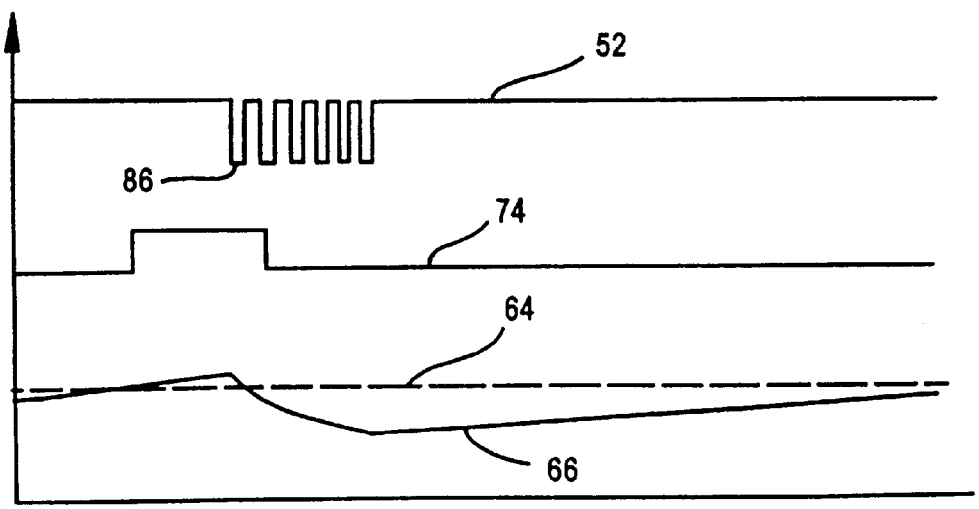
FIG. 4 is a chart of specific signals generated by the throttling apparatus of FIG. 3.

The PWM 70 activates the CPU stop line 52 in response to the CPU throttling signal 74 according to the battery pack discharge current status. One lead 54 of the battery pack 40 is coupled to the computing system power input 33 to supply power to the computing system 10. Another lead 56 is coupled to a current measurement resistor R and an amplifier 58. The amplifier 58 outputs a voltage signal 60 which is proportional to the battery discharge current 62. Such voltage signal 60 passes through a low pass filter 65 which has a time constant much shorter than the current measurement resistor/amplifier. Referring to FIGS. 3 and 4, the filtered signal 66 is fed to a comparator 68 which also receives a reference signal 64 from a reference 72. When the discharge current 62 exceeds the reference 72, the comparator 68 activates a throttle control signal 74 which is output to the CPU chip set 22.

In the illustrated embodiment, the CPU chip set 22 includes a CPU 21, a CPU temperature monitoring circuit 82, along with a built-in pulse width modulation circuit 70. The CPU temperature monitoring circuit 82 activates the CPU stop line 52 when the CPU 21 exceeds a threshold temperature. In addition, the throttle control signal 74 of the throttling circuit portion 50 also feeds into the PWM 70. When the input from either the throttling circuit portion 50 or the temperature monitoring circuit 82 are active, the pulse width modulation circuit 70 modulates the CPU stop line 52 at a fixed duty cycle. Accordingly, the CPU 21 is operated at such fixed duty cycle. During one portion 86 of the duty cycle the CPU is halted. During the remaining portion the CPU is running normally. Accordingly, when the throttle control signal 74 is active, the built-in PWM circuit 70 operates the CPU at the fixed duty cycle. Typically, the built-in PWM circuit 70 includes a prescribed delay so that once the CPU stop modulation is activated, it is not deactivated for a prescribed time period, regardless of the throttle control signal 74 level. This prevents the PWM circuit 70 from 'bouncing' on and off. In this embodiment, the throttling apparatus 44 includes the circuit portion 50, along with the built-in pulse width modulation circuitry 70 of the chip set 22.

Figure 5:
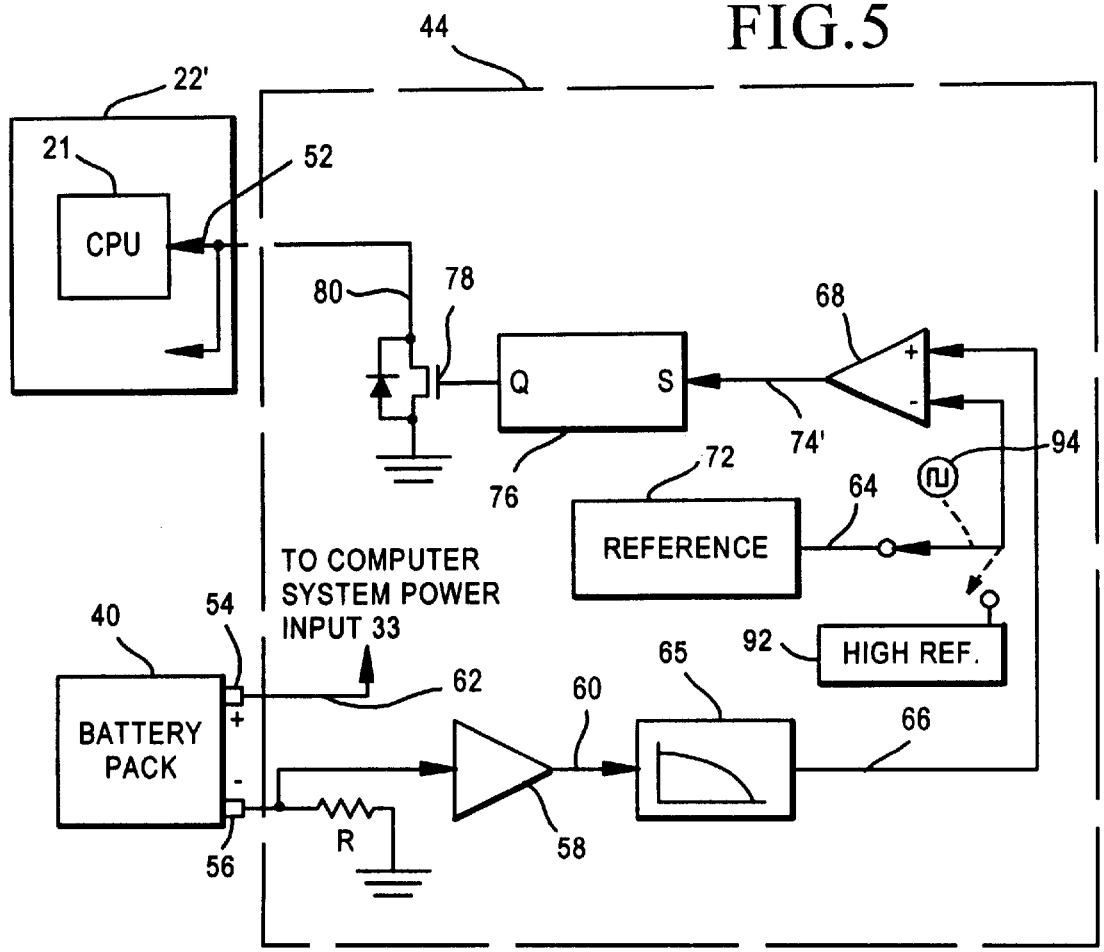
FIG. 5 is a schematic diagram of the system of FIG. 2 according to another specific embodiment of the invention.

Referring to FIG. 5, in an alternate embodiment, a pulse width modulation is implemented apart from the CPU chip set 22. In such embodiment, the throttling circuit 44 is coupled directly to the CPU 21. As in the FIG. 3 embodiment, one lead 54 of the battery pack 40 is coupled to the computing system power input 33 to supply power to the computing system. The other lead 56 is coupled to a current measurement resistor R and an amplifier 58. The amplifier 58 outputs a voltage signal 60 which is proportional to the battery discharge current 62. Such voltage signal 60 passes through a low pass filter 65 which has a time constant much shorter than the current measurement resistor/amplifier. The filtered signal 66 is fed to a comparator 68 which also receives a reference signal 64 from a reference 72. When the discharge current 62 exceeds the reference 72 level, the comparator 68 outputs a throttle control signal 74' to a one shot 76. The one shot 76 turns on a transistor 78 allowing the throttle control signal 80 to feed into the CPU stop line 52 of the CPU 21.

Figure 6:
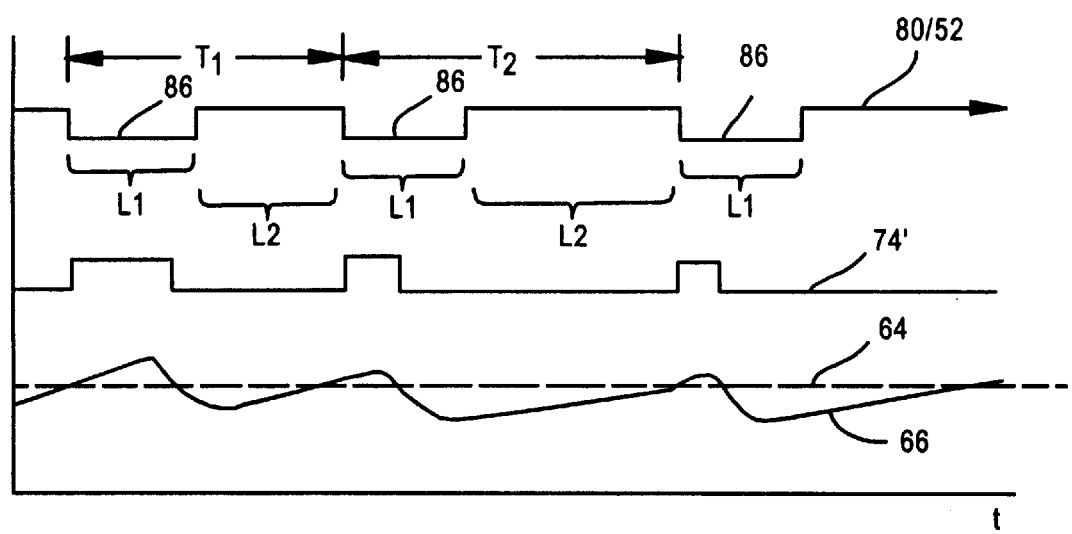
FIG. 6 is a chart of specific signals generated by the throttling apparatus of FIG. 5.

When the filtered signal 66 exceeds the reference signal 64, the one shot fires. The firing period 86 of the one shot is fixed. Accordingly, the time period L1 for which the CPU 21 is halted is fixed. The time period L2 in between one shot firings, however, may vary according to the embodiment. In some embodiments the time period L2 between firings is fixed. In one embodiment, as illustrated in FIGS. 5 and 6, the time L2 between firings varies according to the discharge current. More specifically, the filter 65 imposes a time delay into signal 66 in proportion to the measured signal 60. The larger the measured signal 60 (and thus the larger the difference between the discharge current and a threshold level), the shorter the time interval L2 between firings. As the measured current falls, the time period T between firings increases. According to such embodiment, the firing time length L1 (and thus the CPU halt time) is fixed, but the CPU on time L2 varies. The duty cycle is varied relative to the discharge current 62. Referring to FIG. 6, the filtered signal 66, the reference signal 64, the comparator output signal 74', the CPU stop line 52, and the throttle control signal 80 are shown. Note the fixed length (L1) halt time pulse 86 and the varying time period T. For a high measured current the time period is T1. For a smaller measured current thereafter, the time period T2 is longer.

Figure 7:
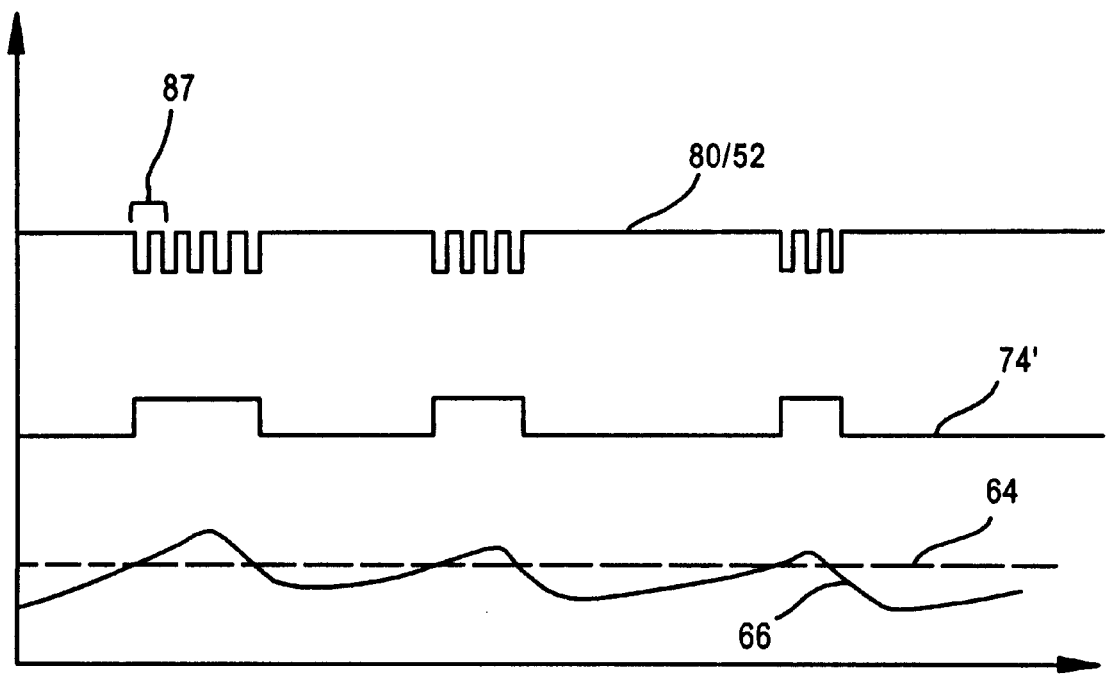
FIG. 7 is a chart of specific signals generated by the throttling apparatus of FIG. 5 according to another embodiment.

In another embodiment, as long as the filtered signal 66 exceeds the reference signal 64, the one shot fires at a fixed period 87 as shown in FIG. 7. Thus, the processor is halted at a fixed duty cycle.

In still another embodiment the duty cycle is varied by controlling the length of the CPU halt time, rather than the CPU on time. The effect in either changing the on time or changing the off time is to change the duty cycle in relation to the measured current 60. Note that it is preferred that the halting occur in a periodic fashion for a portion of a period, rather than during the entire time that the comparator signal 74' exceeds the reference signal 64.

In some embodiments, the amount of time for which the CPU can be halted is further limited by switching from the reference 72 to a larger high reference 92. The high reference 92 is selected as to be larger than the filtered signal 66 would ever be. An oscillator 94 is used in one embodiment to switch between the reference 72 and the high reference. When the high reference 92 is connected to the comparator 68, the CPU will always operate in the on state. When the reference 72 is connected to the comparator 68, the CPU is halted at some duty cycle as described above—(when the discharge current exceeds a threshold level.) The oscillating frequency for switching between the reference 72 and the high reference 92 is selected so as to assure that the CPU operates frequently enough to maintain critical operations avoiding loss of data.

MERITORIOUS AND ADVANTAGEOUS EFFECTS

An advantage of the invention is that a smaller battery pack can be used safely with an increasingly powerful CPU. In particular, when the computing system is operating on line current in AC mode without the battery, the CPU can operate at full speed drawing the power as needed to maximize system performance. When the system is operating off the battery pack, performance will not be affected for many applications where excessive power is not drawn. Performance is traded off under some conditions in exchange for the reduced cost and lighter weight of a smaller than optimal battery pack. As a result, a smaller battery pack can be used safely to meet the needs of many computing applications. This may be particularly beneficial for the value segment of the portable computing market where cost is a significant factor.

Although a preferred embodiment of the invention has been illustrated and described, various alternatives, modifications and equivalents may be used. For example, although the throttling circuit 44 is illustrated as a hardware circuit, in another embodiment an embedded controller or programmable processor performs the analysis in software to generate the throttling control signal 80 and/or CPU stop control signal 52. Therefore, the foregoing description should not be taken as limiting the scope of the inventions which are defined by the appended claims.

What is claimed is:

1. An apparatus for reducing average discharge current of a battery pack, the battery pack supplying power to a portable computer, the apparatus comprising:

a first circuit which generates a throttling signal when the average discharge current exceeds a threshold level; and a second circuit responsive to the throttling signal for slowing a processor of the computer system, wherein the slowing of the processor causes the average discharge current to be reduced.

2. The apparatus of claim 1, in which the second circuit halts the processor for a portion of a duty cycle in response to the throttling signal.

3. The apparatus of claim 2, in which the duty cycle is proportional to an excess of the average discharge current beyond the threshold level.

4. The apparatus of claim 1, in which the first circuit comprises a comparator which compares the average discharge current to the threshold level to generate an output signal in response, and a one shot device responsive to the output signal to generate the throttling signal.

5. The apparatus of claim 1, in which the second circuit comprises a pulse width modulator which receives the throttling signal.

6. A computing system, comprising:

a processor;

a battery which generates a discharge current to supply power to the processor;

a first circuit for generating a first signal corresponding to the discharge current;

a second circuit responsive to the first signal and a reference signal for generating a throttling signal when the first signal exceeds the reference signal; and a third circuit responsive to the throttling signal for slowing the processor, wherein the slowing of the processor causes the discharge current of the battery to be reduced.

7. The system of claim 6, in which the third circuit halts the processor for a portion of a duty cycle in response to the throttling signal.

8. The system of claim 7, in which the duty cycle is proportional to a difference between the first signal and the reference signal.

9. The system of claim 6, in which the second circuit comprises a comparator which receives the first signal and the reference signal.

10. The system of claim 9, in which the second circuit further comprises a one shot device, wherein the comparator generates a comparison signal based on a comparison of the first signal and the reference signal, and wherein the one shot receives the comparison signal and generates the throttling signal in response.

11. The system of claim 6, in which the third circuit comprises a pulse width modulator which receives the throttling signal.

12. A method for reducing an excess discharge current from a battery, wherein said excess discharge current is relative to a threshold level, the method comprising the steps of:

measuring discharge current from the battery;

determining a difference between the measured discharge current and the threshold level;

generating a throttling signal when the measured discharge current exceeds the reference signal; and slowing a processor powered by the battery in response to the throttling signal.

13. The method of claim 12, wherein the step of slowing comprises stopping the processor for a portion of a duty cycle.

14. The method of claim 13, further comprising the step of controlling the duty cycle in relation to said measured discharge current.

15. An apparatus for reducing average discharge current of a battery pack, the battery pack supplying power to a portable computer, the apparatus comprising:

means for generating a throttling signal when the average discharge current exceeds a threshold level; and means responsive to the throttling signal for reducing power demand of a device of the portable computer, wherein the reduced power demand causes the average discharge current to be reduced.

16. The apparatus of claim 15, in which said device is a processor.

17. The apparatus of claim 15, in which the device is a peripheral device among the group of peripheral devices, including a hard disk drive, a printer, a display and a floppy disk drive.

18. The apparatus of claim 15, in which the responsive means comprises a processor.

19. The apparatus of claim 15, in which the generating means comprises a processor.

20. The apparatus of claim 15, in which the generating means comprises a comparator and a one-shot device; and in which the responsive means comprises a pulse width modulator.

* * * * *